June 8, 1965 W. S. KINNARD 3,187,652
METHOD AND APPARATUS FOR MEASURING LIGHT
Filed Jan. 4, 1960
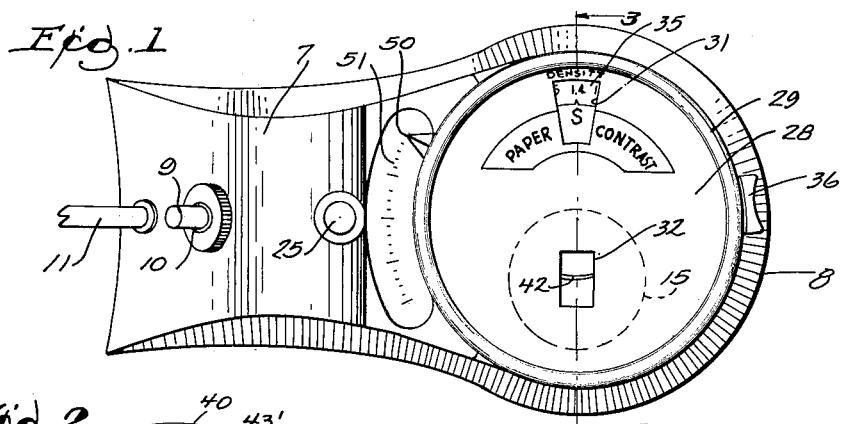
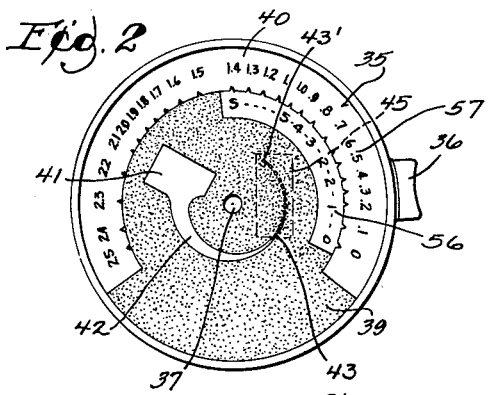
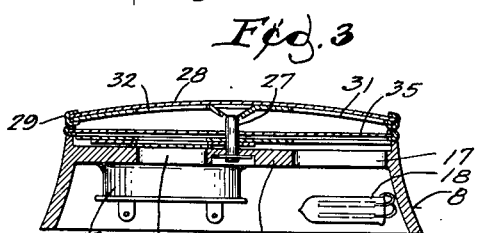
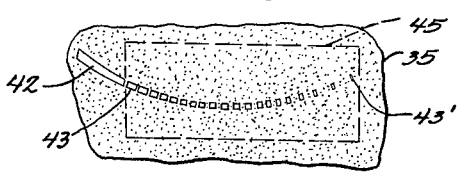
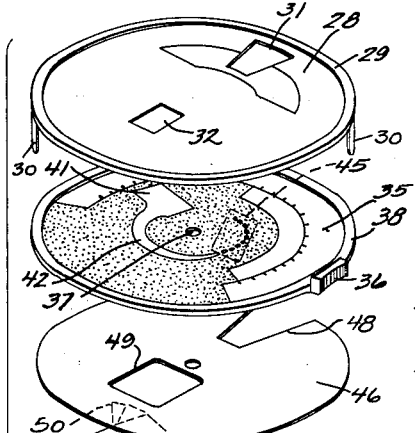
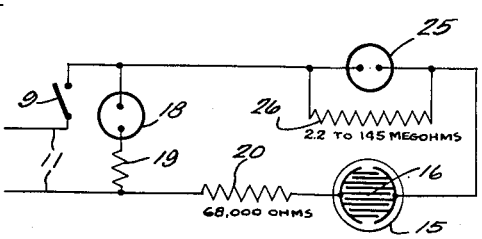
INVENTOR.
WOLCOTT S. KINNARD
BY
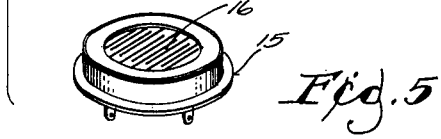
ATTORNEYS

United States Patent Office 3,187,652
Patented June 8, 1965

3,187,652
METHOD AND APPARATUS FOR
MEASURING LIGHT
Wolcott S. Kinnard, 4665 N. 56th St., Milwaukee, Wis.
Filed Jan. 4, 1960, Ser. No. 114
4 Claims. (Cl. 95—10)

This invention relates to light metering apparatus.

In its broader aspects, the invention relates to means for measuring intensity of a light source whether of constant brilliance or in the nature of a flash. The circuit employed is one using a photo-conductive cell and glow lamp, the latter desirably being shunted by a resistance. It is found that the accuracy of response is much greater with the use of a resistance shunting the lamp than is possible if the resistance is in series.

For use in measuring the illumination of a relatively fixed source, there is employed a light wedge of a type which is rotatable between the source and the cell and provides a "window" of progressively decreasing cross section, the desired relationship being such that the light is cut in half with every fifteen degrees of rotation. Despite the impossibility of achieving this result with a continuously variable "window," I have found it possible to get precisely the desired effect by making the "widow" discontinuous, in the form of dots which vary in spacing and area progressively in the desired ratio, a diffusing screen being used to give the desired effect regardless of the discontinuity of the "window."

In some aspects, the circuit involved may be regarded as having a resistance which is variable according to the light to which the cell is exposed, thus having the effect of a variable resistor with no moving contact such as would cause friction noise in a conventional variable resistance device. Moreover, the device as herein disclosed does not vary with time and usage but retains fixed values for the life of the parts.

For determining the desirable exposure of a photographic film in conjunction with an electronic flash device, the cell is exposed to the light of the flash, to the exclusion of other light. Due to the characteristics of the cell and the neon glow tube, the circuit will remain conductive for an appreciable period which is directly related to the amount of light to which it was exposed during the flash. Accordingly, by simply noting the relative time elapsing from exposure to extinction of the glow lamp, the relative amount of light of the flash can be calculated with considerable accuracy.

In the drawings:

FIG. 1 is a plan view of an instrument embodying the invention.

FIG. 2 is a plan view of the rotor and its graduated "window opening."

FIG. 3 is a detail view in cross section taken on the line 3—3 of FIG. 1.

FIG. 4 is a fragmentary detail view in plan showing on an enlarged scale the series of dots used on the rotatable window disk.

FIG. 5 is a view showing in perspective the relatively separated components which are stacked within the instrument.

FIG. 6 is a circuit diagram.

In the portion 7 of case 8, there is a switch 9 having a control lever 10 for opening and closing the circuit supplied from the lamp cord 11. The case includes a platform portion 12 with an opening at 13 beneath which is mounted the photo-conductive cell 15, this cell being of the type in which the resistance varies according to the light falling upon its grid 16.

Another opening at 17 in the base 12 of the case passes upwardly the light from the dial lamp 18 which is connected across the line through a resistor 19 as shown in FIG. 6.

The photo-conductive cell 15 is connected across the line in series with a resistor 20 which, in practice, may conveniently have a resistance of 68,000 ohms. Also in series with the cell 15 is the glow lamp 25 across which is shunted a resistor 26. Because both the cell 15 and the glow lamp 25 have been found to have characteristics which may vary materially, it is necessary to correct these variations by choice of appropriate resistance 26. Instead of using a variable resistor, which would have a limited range at best, it is preferred to substitute fixed resistances of different values until the desired characteristics have been made to conform to a predetermined standard. It is broadly immaterial what that standard is. In practice, the resistance used at 26 has averaged about 22 megohms but has varied, in specific instances, all the way from 2.2 megohms to 145 megohms.

The photo-conductive cell used is one manufactured by Radio Corporation of America and known as its No. 7163. the neon glow lamp used is one identified commercially as NE2E.

The base 12 of the instrument case 3 is provided with a center post 27 upon which is mounted the cover glass 28. This is generally opaque and is framed in a ring 29 provided with ears 30 for anchoring it to the base. In its generally opaque surface there are windows at 31 and 32. The window 31 is centered above the dial illuminating lamp 18. The window 32 is disposed directly above the cell 15. The glow lamp 25 is mounted in the case in a position offset from the cover glass 28.

Beneath the cover glass 28 is a rotatable metering disk 35 which has a projecting tab 36 engageable for the rotation of the disk about the center post 27. The disk has an aperture at 37 bearing on the pin. This disk is conveniently made of generally transparent film material with a metal frame at 38 as best shown in FIG. 5. The area 39 of the disk is opaque. The area 40 of disk 35 is transparent and has a scale or scales printed thereon to be visible through the window 31 of the cover glass 28.

In the generally opaque area 39 there is a density wedge window which starts with a relatively large transparent area at 41 from which there extends arcuately a transparent area 42 of progressively decreasing width. The decrease is on a geometric basis until the width becomes too minute to permit of further decrease on that basis. At that point, the window becomes discontinuous as best shown in FIG. 4, being comprised of a series of dots 43 which, at first, have substantial elongation and are progressively decreased in length as well as in width until, at 43', the transparent dots are relatively shorter than they are wide.

In order to permit the use of these discontinuous transparent dots as distinguished from the continuously variable width of the portion 42 of the density wedge window, I apply over the dots a piece of translucent diffusing material 45. This may take the form of a patch as shown in FIGS. 2 and 5. Ground glass may be used but I have found it preferable to use a very thin plastic or synethic resin of translucent milky composition.

It will be understood that the window with its discontinuous series of transparent dots of varying area is not truly a density wedge except in the sense in which this term may be used generically. In previously known apparatus, the window area is actually varied in opacity. Hence such a device has become known as a density wedge. In the present instance the variable effect is produced by varying the proportionate size of transparent to opaque portions of the "window," thus giving the result without any actual change in density.

The opaque area 39 is desirably coated with a white reflecting coat 40 so that the image projected thereon will be visible to facilitate orienting the instrument with reference to a selected area of the image. This coating may be applied by silk screening and it has the further advantage of covering any pin hole defect in the photographically made opaque portion 39 of disk 35. As already stated, the disk 35 is conveniently made of film. For convenience of manufacture, the film is sensitized and the desired pattern of relatively transparent and opaque areas thereon are made by photographic exposure and development.

Beneath the adjustable metering disk 35 is a relatively fixed disk at 46 which is interposed between the rotatably adjustable disk 35 and the underlying rotatably variable disk 47, the object being to prevent the motion of one disk from being communicated inadvertently to the other. The disk 46 has openings at 48, 49 which are respectively registered with window openings 31 and 32 in the cover glass 28.

The variable disk 47 has a pointer at 50 which projects from beneath the cover glass to register with a scale provided at 51 on the case 8 of the instrument. The disk 47 is opaque except for triangular window portions 52, 53 and 54 which are of varying density. According to the position of the pointer 50 in scale 51 any one of these areas 52, 53 or 54 of varying density may be registered between the window 32 and the cell 15 to provide different ranges for the particular uses of the instrument.

The cell 15 is desirably arranged with its grid 16 approximately radial with reference to the center post 37 so that the variable density wedge 42 moves across the grid substantially at right angles.

In the normal usage of the instrument, the pointer 50 is at the extreme righthand end of the scale 51 as shown in FIG. 1 to register the clear or wholly transparent triangular portion 52 with the photo-conductive cell 15. Suppose the device is to be used to determine the degree of contrast of enlarging paper which is appropriate to employ for the particular negative. To do this, it is desired to obtain comparative readings of the amount of light projected onto the cell 15 through the darkest area and the lightest area of the projected image.

The instrument is placed beneath the enlarging projector with its window 32 beneath the lightest area of the projected image. This will represent the shadow in the finished enlargement. The disk or dial 35 is initially set at an intermediate point as shown in FIG. 1 so that the letter S appears in the window 31 beneath the density scale. At this point, the glow lamp 25 should emit a full glow. The diaphragm of the projector is then adjusted to reduce the amount of light projected therefrom until the glow lamp 25 is barely extinguished.

The instrument is then moved to register its window 32 beneath the darkest area of the projected image. This will represent a highlight in the finished print. The dial 35 is rotated by the tab 36 in a direction to increase the amount of light reaching the photo-conductive cell 15 until the lamp 25 again begins to glow. At this point, the tab will be used to manipulate the disk 35 backward until the glow lamp is barely extinguished. The reading of that portion of scale 56 exposed in the window 31 will now give a measure of the density range of the negative and will indicate the desirable contrast of the paper to be selected in making the enlargement. The scale 57, on the other hand, will give a reading of the amount of light reaching the cell 15 at any given time when the light has just been extinguished.

Without the shunt resistor 26, it was found to be impossible to extinguish the glow lamp 25 even in total darkness. A resistor in series with the glow lamp will make it possible to extinguish the lamp but the sensitivity of the response of the instrument will be greatly reduced as compared with the use of the shunt resistance as disclosed. With the shunt resistor the response is so delicate that the glow lamp may be extinguished with a very minute movement of the neutral density wedge of dial 35, or the diaphragm of the enlarging projector, as the case may be.

As indicated above, the instrument as disclosed comprises a means of producing infinite variation in resistance without any moving parts in the instrument itself. This is what happens, in effect, when the diaphragm of the projector is opened or closed to vary the amount of light falling on cell 15. In certain types of electronic equipment, this provides a means whereby variable resistance can be had without any friction noise.

For use in measuring proper exposure of photographic film in conjunction with a particular electronic flash at a particular distance from the subject, it is only necessary to fire the flash to energize the glow lamp through cell 15 at the distance between the lamp and the subject. Because this particular glow lamp will continue to glow for an appreciable period after being thus energized, and because that period is related to the amount of light to which the cell has been exposed by the flash, a reading of the time which elapses between the flash and the extinction of the glow will give a relative reading of the intensity of the flash to which the subject will be exposed when the flash is used photographically.

I claim:
1. The method of using a glow lamp and photo-conductive cell series-connected with each other and connected with a source of current to determine the diaphragm setting to be used in photographing a subject exposed to a flash of light, such method comprising exposing said cell to a like flash at the distance of the subject from such flash, the flash causing the lamp to glow temporarily, and setting the diaphragm at an opening inversely related to the period of time which elapses between the flash and the extinction of the glow of said lamp.

2. A meter of the character described comprising the combination with a photo-conductive cell and a neon glow lamp shunted by a resistor, the said cell and glow lamp having a series connection and means for supplying current thereto, of a variable density screen having a mounting upon which it is movable across said cell in a manner to vary the amount of light reaching said cell from a given source to which the cell is exposed through said screen, the screen comprising opaque areas having minute transparent openings of progressively varying area, the said transparent openings being spanned by means for diffusing light passing through said openings toward said cell.

3. The device of claim 2 in which the cell has a grid, the transparent openings of said screen being so arranged as to pass transversely across the grid.

4. The device of claim 2 in which the screen comprises a plastic film of transparent material upon which an opaquing substance is applied, the diffusing material comprising a translucent sheet attached to said film and spanning the transparent dots from which the opaquing material is absent.

References Cited by the Examiner
UNITED STATES PATENTS

| 1,107,438 | 8/14 | Moskowitz | 315—151 |
|---|---|---|---|
| 1,150,953 | 8/15 | Moskowitz | 315—151 |
| 1,895,853 | 1/33 | Kennedy | 88—23 |
| 2,000,425 | 5/35 | Strauss | 88—23 |
| 2,037,925 | 4/36 | Rentschler | 88—23 X |
| 2,149,250 | 3/39 | Bing | 88—23 |
| 2,242,638 | 5/41 | Balsley | 315—151 |
| 2,243,383 | 5/41 | Leber | 88—23 |
| 2,331,027 | 10/43 | Harrison | 88—108 |
| 2,528,038 | 10/50 | Crise | 88—108 |
| 2,896,508 | 7/59 | Biedermann | 88—23 X |

FOREIGN PATENTS 326,624   3/30   Great Britain.

NORTON ANSHER, *Primary Examiner.*
EMIL G. ANDERSON, *Examiner.*